United States Patent Office 2,979,526
Patented Apr. 11, 1961

2,979,526

PRODUCTION OF AMMONIUM SALTS OF AROMATIC ACIDS BY HYDROLYSIS OF AROMATIC NITRILES

Edward James Gasson and David James Hadley, Epsom Downs, England, assignors to The Distillers Company Limited, Edinburgh, Scotland, a British company No Drawing. Filed Sept. 12, 1956, Ser. No. 609,352

Claims priority, application Great Britain Sept. 27, 1955

5 Claims. (Cl. 260—515)

The present invention relates to the hydrolysis of aromatic nitriles, and in particular to the hydrolysis of aromatic nitriles and dinitriles to form the corresponding ammonium salts.

It is well known that aromatic nitriles are hydrolysed when heated with aqueous solutions of strong acids or strong bases, the product being the corresponding acid or its salt. It is also known that it is generally possible to control the conditions of hydrolysis so that amides result. As a means of producing the acid, or derivatives from which the acids can be obtained, on an industrial scale these methods have the disadvantage of requiring large amounts of expensive reactants.

It is an object of the present invention to provide an improved process for the hydrolysis of aromatic nitriles which does not require the use of large quantities of expensive hydrolysing agents. It is a further object of the invention to provide a process for the hydrolysis of aromatic nitriles to form the corresponding ammonium salts.

According to the present invention the process for the production of ammonium salts of aromatic carboxylic acids comprises contacting an aromatic nitrile and/or imide with water at an elevated temperature and preferably under superatmospheric pressure preferably in the presence of an alkaline catalyst.

The aromatic nitriles which may be used as starting materials for the process of the present invention are those compounds in which one or more cyanide radicals are attached directly to a benzene or naphthalene nucleus. As examples of the compounds falling within this class may be mentioned benzonitrile, terephthalonitrile, isophthalonitrile, phthalonitrile or phthalimide, the tolunitriles and the naphthonitriles. Phthalimide is an example of an imide starting material. The process of the invention is particularly applicable to the conversion of terephthalonitrile to diammonium terephthalate, and to the conversion of isophthalonitrile to diammonium isophthalate. Diammonium terephthalate can be converted directly or via terephthalic acid to the fibre-forming linear polyester polyethylene terephthalate, well-known under the trade names "Terylene" and "Dacron." One manufacturing route hitherto adopted commercially for the production of polyethylene terephthalate has involved the use, as an intermediate, of terephthalic acid produced by the liquid phase nitric acid oxidation of p-xylene or p-cymene. Since the purification of terephthalic acid presents technical difficulties on account of its high melting and insolubility characteristics, it has then been necessary to convert the impure oxidation product into dimethyl terephthalate, which can be more easily purified by vacuum distillation or recrystallisation methods, and to carry out an ester-interchange reaction between the di-ester and excess ethylene glycol to form the desired polymer. Another process which has also been carried out on the industrial scale involves the liquid phase air oxidation of p-xylene to p-toluic acid, the conversion of this to p-methyl toluate, and the further oxidation of the methyl ester to the corresponding methyl hydrogen phthalate. The latter compound is then esterified to form dimethyl terephthalate which is converted to polyethylene terephthalate as before. These processes have necessitated the use of expensive reactants, such as nitric acid, and because of the plurality of steps needed, the installation of expensive plant.

The present invention therefore provides a process for the production of an intermediate, diammonium terephthalate from which polyethylene terephthalate can be made by way of an improved route.

The hydrolysis reaction may be carried out in the presence of an amount of water slightly in excess over that required for the theoretical reaction but if desired larger proportions of water may be used, for instance up to 20 parts by weight of water per part of nitrile starting material. It is also possible to carry out the reaction by contacting the aromatic nitrile with an aqueous solution of the ammonium salt of the corresponding aromatic carboxylic acid.

The temperatures which may be used in the reaction vary widely. It is preferred to operate at about 150°–220° C. although higher temperatures may be used if desired, and the reaction is operable at temperatures down to about 100° C., if rather slow at the lower temperatures. The reaction is preferably carried out in a closed system under pressure to maintain the temperature in the desired range.

Although the hydrolysis may be carried out in the absence of catalysts, it is preferred to use an alkaline catalyst. A wide variety of alkaline catalysts may be used to promote the reaction according to the present invention, for instance ammonia, magnesia, sodium hydroxide, calcium carbonate and the like. Where the catalyst is ammonia its concentration may vary within wide limits, for instance between 0.1 and 6 moles or more of ammonia per mole of aromatic nitrile. In the case of the solid catalysts amounts in the range 0.01 mole to 0.1 mole per mole of nitrile are suitable. The use of an excess of the solid catalysts mentioned above is undesirable since it may result in the formation of large amounts of salts of the acid corresponding to the nitrile starting material.

The reaction is carried out over a period of from about 3 to 24 hours to ensure completion of the reaction. If the reaction is not carried fully to completion the product will contain proportions of the corresponding amide. Where the reaction product is to be converted into the corresponding acid, which can be carried out by heating the ammonium salt to a temperature at which ammonia is evolved and removing the liberated ammonia according to the process of our copending application Serial No. 648,785, filed March 27, 1957, the presence of these amides in the reaction product may not be disadvantageous since they will also be converted to the acid. However, in the case of terephthalonitrile, if the diammonium salt is to be subsequently converted to polyethylene terephthalate, it is important to ensure that the hydrolysis reaction proceeds far enough to convert all cyano groups at least to amide radicals. The presence of compounds such as p-cyanobenzamide in the glycol esterification process for the production of polyethylene terephthalate is to be avoided because although these react with the ethylene glycol to form mainly polyethylene terephthalate they also form undesired by-products.

The aromatic nitrile starting material for the process of the present invention may be obtained, for instance according to the process of our copending application Serial No. 610,901, filed September 20, 1956, now U.S. Patent No. 2,838,558.

On completion of the hydrolysis reaction the ammonium salts may be recovered by conventional techniques, for instance by evaporating off any excess water, and re-crystallising from a suitable solvent, such as water. In some cases where small proportions of water have been used in the reaction the ammonium salt may crystallise out simply on cooling the reaction mixture. In the case of the hydrolysis of terephthalonitrile, where the diammonium terephthalate is to be converted to polyethylene terephthalate, this may be carried out by heating the crude reaction product after removal of water, or after further purification, with excess of ethylene glycol, if desired in the presence of a catalyst such as magnesium, sodium terephthalate, litharge or zinc borate. The addition of catalysts may be unnecessary if these are present from the previous step. If the initial stages of the reaction ammonia is evolved and removed from the reaction mixture, and on completion of the esterification the excess glycol is removed, preferably by distillation under reduced pressure. The condensation product may then be subjected to further heating under reduced pressure to obtain the desired high molecular weight polymer.

The following examples are given to illustrate the process of the invention. In the examples all parts are by weight.

Example 1

Terephthalonitrile (40 parts), water (70 parts) and aqueous ammonia (d., 0.880, 12 parts) were heated in a stainless steel rocking autoclave at 220° C. for 3 hours. The cooled product was evaporated to dryness under reduced pressure at about 60° C. yielding ammonium terephthalate as a white solid (61 parts) in 97% yield.

10 parts by weight of the ammonium terephthalate were heated with ethylene glycol (50 parts), magnesium oxide (0.075 part) and sodium methoxide (0.01 part) in a nitrogen atmosphere at 195° C. under reflux for 24 hours. During this period ammonia was evolved equivalent to the ammonium salt present at the start. Glycol was distilled from the solution at normal pressure and the temperature of the residual glycol terephthalate was then raised to 275° C. and maintained at this temperature for one hour. The pressure was then reduced to 1 mm. Hg, and heating continued for a further hour at 275° C.

The product, polyethylene terephthalate (9.3 parts) possessed fibre-forming properties.

Example 2

Terephthalonitrile (10 parts), magnesium oxide (0.5 part) and water (800 parts) were heated in a rocking autoclave at 130° C. for 17 hours, the product cooled to room temperature and filtered. The precipitate (7.0 parts) was terephthalamide, melting at 317–324° C.

Found: N, 17.2%; $C_8H_8O_2N_2$ requires N, 17.1%.

The yield of terephthalamide was 54.7% of the theoretical.

Evaporation of the filtrate to dryness gave a residue consisting principally of ammonium terephthalate, but containing also the intermediate hydrolysis product, ammonium terephthalamate.

The yield of this mixture was 5.6 parts by weight, i.e. about 38% of the theoretical yield.

Example 3

Terephthalonitrile (12 parts), water (250 parts) and aqueous ammonia (d. 0.880, 10 parts) were heated under reflux at 100° C. for 120 hours, the product cooled and filtered, and the residue washed with water. Evaporation of the combined filtrate and washings to dryness gave ammonium terephthalate (6.26 parts), as a white residue in 33% yield. The solid left on the filter (7.42 parts) contained unhydrolysed terephthalonitrile as well as intermediate products such as terephthalamide, para-cyanobenzamide, and ammonium terephthalamate.

Example 4

Terephthalonitrile (10 parts), water (25 parts) and sodium hydroxide (0.06 part) were heated in an autoclave at 220° C. for 6 hours, the product removed from the autoclave and dried at 110° C. in an oven. The resulting white solid (14.73 parts) consisted principally of diammonium terephthalate but contained also some ammonium hydrogen terephthalate, formed by loss of ammonia during drying.

Treatment of the product with aqueous ammonia and evaporation to dryness in a vacuum desiccator gave pure diammonium terephthalate. The yield, based on terephthalonitrile was 99.3%.

Example 5

Terephthalonitrile (10 parts), water (25 parts) and magnesium oxide (0.1 part) were heated in a rocking autoclave at 220° C. for 6 hours, cooled and dried under vacuum at about 70° C. 15.1 parts of ammonium terephthalate were obtained corresponding to a yield of 96.6%.

Example 6

Isopthalonitrile (10.24 parts), water (25 parts) and ammonia (1 part) were heated at 220° C. for six hours in a rocking autoclave, cooled and dried under vacuum at about 70° C. Ammonium isophthalate (15.78 parts), was obtained as a white solid in 98.7% yield.

Example 7

Terephthalonitrile (40 parts) and water (400 parts) were heated in a nitrogen atmosphere in a rocking autoclave at 290–300° C. and 75–85 atmospheres' pressure for 24 hours. Filtration of the cooled product removed unreacted terephthalonitrile and the intermediates, para-cyanobenzamide and terephthalamide (1.37 parts). The filtrate was concentrated to a small bulk under reduced pressure and precipitation of ammonium terephthalate completed by stirring the residue with acetone (100 parts).

After removal of acetone by filtration, the ammonium terephthalate was dried under vacuum. The yield was 59.5 parts, corresponding to a yield of 95.2%.

Example 8

Benzonitrile (25 parts), ammonia (1.5 parts) and water (180 parts) were heated in a stainless steel rocking autoclave at 220° C. for 6 hours, the cooled product concentrated in a vacuum still at about 15 millimetres' pressure until about 140 parts of water had been distilled, and the residue stirred with acetone (200 parts) at room temperature. The precipitated ammonium benzoate, dried under vacuum, amount to 19.6 parts, and represented a 66.7% yield from benzonitrile. Evaporation of the acetone filtrate left a residue of benzamide (8.23 parts) which are recycled to the next batch for hydrolysis. A small amount of unreacted benzonitrile was recovered from the aqueous distillate and recycled.

Example 9

14 parts of crude phthalimide produced by the oxidation of ortho-xylene in the presence of ammonia at an elevated temperature, containing 86% of phthalimide and 14% of phthalonitrile, was heated in a rocked, stainless steel bomb with water (120 parts) and aqueous ammonia (d. 0.880, 14 parts) at 180° C. for 40 hours. The cooled product was evaporated to dryness under reduced pressure to give 18.9 parts of a white solid which consisted of ammonium phthalate containing about 11% of ammonium phthalamate. The calculated yield was 97% of the theoretical.

The ammonium salts produced by the process of the present invention are valuable intermediates in the production of acids and esters.

We claim:

1. The process for the production of ammonium salts of aromatic carboxylic acids which comprises reacting under superatmospheric pressure in a closed system for more than about three hours, a starting material selected from the group consisting of terephthalonitrile, isophthalonitrile, benzonitrile, phthalimide, tolunitrile, and naphthonitrile with up to 20 parts by weight of water per part of starting material at a temperature of between about 100° C. and 300° C. in the presence of a catalyst selected from the group consisting of ammonia, magnesium oxide, sodium hydroxide and calcium carbonate in an amount less than that which will cause formation of large amounts of salts of the acid corresponding to the starting material, the amount of catalyst in the case of magnesium oxide, sodium hydroxide and calcium carbonate being 0.01 to 0.10 mole per mole of starting material and the amount of catalyst in the case of ammonia being 0.10 to about 6 moles per mole of starting material.

2. A process as in claim 1 and wherein the catalyst is ammonia in a concentration of between 0.10 and 6 moles per mole of starting material.

3. The process as in claim 1 and wherein the catalyst is sodium hydroxide in a concentration of between 0.01 and 0.1 mole per mole of starting material.

4. The process as in claim 1 and wherein the catalyst is magnesium oxide (magnesia) in a concentration of between 0.01 and 0.1 mole per mole of starting material.

5. The process as in claim 1 and wherein the catalyst is calcium carbonate in a concentration of between 0.01 and 0.1 mole per mole of starting material.

References Cited in the file of this patent

Fieser et al.: Organic Chemistry, 2nd Ed., page 167 (1950).